May 15, 1923.
H. P. KRAFT
PNEUMATIC VALVE
Original Filed Sept. 2, 1915
1,454,854
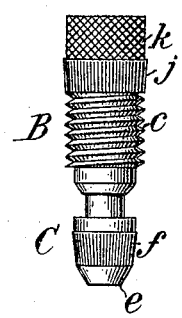
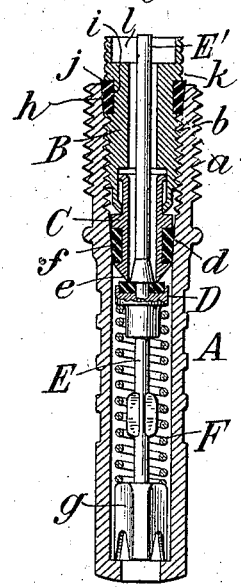
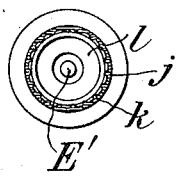
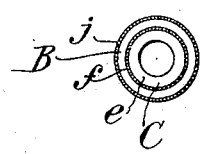
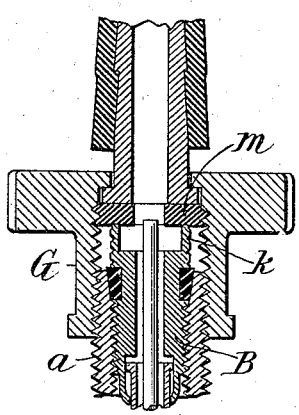
WITNESSES:
René Muine
Fred White
INVENTOR:
Henry P. Kraft
By Attorneys,
Fraser, Dark & Myers Patented May 15, 1923.

1,454,854

UNITED STATES PATENT OFFICE.

HENRY P. KRAFT, OF RIDGEWOOD, NEW JERSEY.

PNEUMATIC VALVE.

Application filed September 2, 1915, Serial No. 48,617. Renewed July 22, 1922. Serial No. 576,869.

*To all whom it may concern:*

Be it known that I, HENRY P. KRAFT, a citizen of the United States of America, residing at Ridgewood, in the county of Bergen and State of New Jersey, have invented certain new and useful Improvements in Pneumatic Valves, of which the following is a specification.

This invention relates to air valves such as are used for pneumatic tires.

Such valves have a tubular outer shell or casing which at its base portion is attached in any suitable manner to the tire, and which at its outer or exposed portion is formed with a neck within which is introduced a plug or seat member against which the valve proper or check seats outwardly. To make an air-tight joint between the seat member and neck, the latter is commonly formed with a coned inner seating face, and the seat member has a groove in which is seated a packing ring or gasket which as the member is forced down into place is compressed against such coned seat. For forcing down the seat member a screw plug is provided, preferably made separately from the seat member and swiveled thereto, so that when withdrawn it pulls the seat member out. This screw plug engages internal screwthreads within the upper part of the bearing above the coned seat.

The present invention provides for making a tight joint between the screw plug and the neck portion of the valve casing, whereby to prevent out-leaking of air during the operation of pumping up the tire.

The screw plug has a head which projects beyond the rim of the casing, and is knurled so that the screw plug may be grasped by the fingers and screwed in by hand. The screw plug has a groove or neck between such knurled head and its threaded body, and in this neck the packing ring or gasket is seated.

Fig. 1 of the accompanying drawings is a vertical mid-section of a tire valve constructed according to this invention;

Fig. 2 is an end view or plan of Fig. 1;

Fig. 3 is an elevation of the seat member and screw plug removed;

Fig. 4 is an inverted plan of Fig. 3.

Fig. 5 is a fragmentary section showing a pump connection applied to the valve.

Referring to the drawings, A is the outer shell or casing of the tire valve, the lower part of which is constructed in any of the well known ways for adapting it for attachment to a tire or inner tube. The form shown is a so-called cot valve, but this is illustrated simply for convenience. The casing has as usual at its outer or upper end exterior screwthreads $a$ for receiving the pump connection in pumping up, or a valve cap thereafter; and has the usual internal threads $b$ for receiving the internal screw plug B which has corresponding external threads $c$. The casing has also a coned or tapered internal seat $d$. The seat member C is forced down by screwing in the plug B. The member C is shown as constructed in the usual manner with a seat $e$ at its lower end and with a groove or reduced neck above this in which is confined a packing ring or gasket $f$ which seats tightly within the tapered seat $d$. The screw plug B has its lower end swiveled to the seat member in the manner well understood, and as clearly shown in Fig. 1. Within the casing is the usual valve proper or check D, which is shown as mounted on a valve stem or pin E which passes through the seat member and plug, its upper end E' serving as a deflating pin. The lower end of the pin E is headed beneath the usual stop cup $g$ which serves as an abutment for the spring F which presses the check D up against the seat $e$. So far as described the construction is that which is common in the well known Schrader tire valve. The construction shown and described may be modified in any of the well known ways.

The casing A at its upper end is counterbored to form a tapered inner seating face $h$ above its internal screwthreads $b$. The screw plug B is turned down to form a neck $i$ which receives a packing ring $j$ which when in place seats against the seat $h$. The screw plug has at its outer end a head $k$ which when the plug is in place protrudes beyond the end of the casing, and this head is knurled or roughened in any suitable way, so that when grasped by the fingers it may be used to screw in the plug.

The seats $f$ $h$ and packings $d$ $j$ are so related that when the screw plug has been screwed in far enough to force the seat member firmly into place so as to form an airtight fit at the packing $d$, the upper packing $j$ shall similarly make an air-tight fit. The purpose of this upper packing is to prevent leakage of air between the screw plug and casing during the operation of pumping up the tire. For this purpose it is sufficient if the pump connection makes a tight joint with the top of the head $k$. The head is internally counterbored so as to form an annular chamber $l$ surrounding the deflating pin $E'$.

This will be better understood from Fig. 5, which shows the pump connection G screwed on with its packing ring or gasket $m$ pressing down against the top of the head $k$ of the plug so as to make an air-tight joint therewith.

It will be understood that the shape and form of the respective packings and packing faces may be varied in any of the well known ways; also that those portions of the construction which are not novel may be substituted by any known equivalents.

I claim as my invention:—

1. A valve comprising a casing having an externally and internally threaded neck portion and an internal seating face, a seat member comprising a plug wholly enclosed within said casing and having a packing fitting said seating face, and an independently rotatable screw plug swivelled to said seat member above the latter, and having threads adapted to engage the internal threads of the neck portion and force the seat member into place, said screw plug having a head projecting above the casing when the seat member is in place, and constituting a manipulating member for inserting and removing the plugs by hand, the head of the plug projecting only slightly above the top of the casing and being of less diameter than the latter, whereby the external threads of the neck may receive a pump coupling which encloses said head, the latter being adapted to make contact with the packing of said coupling.

2. A valve comprising a casing having an externally and internally threaded neck portion and an internal seating face, a seat member comprising a plug wholly enclosed within said casing and having a packing fitting said seating face, and an independently rotatable screw plug swivelled to said seat member above the latter, and having threads adapted to engage the internal threads of the neck portion and force the seat member into place, said screw plug having a head projecting above the casing when the seat member is in place, and constituting a manipulating member for inserting and removing the plugs by hand, the head of the plug projecting only slightly above the top of the casing and being of less diameter than the latter, whereby the external threads of the neck may receive a pump coupling which encloses said head, the latter being adapted to make contact with the packing of said coupling, and said valve having a packing between said screw plug and said casing adapted to prevent leakage of air out around the screw plug during inflation.

3. A valve comprising a casing having an externally and internally threaded neck portion and an internal seating face, a seat member comprising a plug wholly enclosed within said casing and having a packing fitting said seating face, and an independently rotatable screw plug swivelled to said seat member above the latter, and having threads adapted to engage the internal threads of the neck portion and force the seat member into place, said screw plug having a head projecting above the casing when the seat member is in place, and constituting a manipulating member for inserting and removing the plugs by hand, the head of the plug projecting only slightly above the top of the casing and being of less diameter than the latter, whereby the external threads of the neck may receive a pump coupling which encloses said head, the latter being adapted to make contact with the packing of said coupling and said valve having a packing between said screw plug and said casing adapted to prevent leakage of air out around the screw plug during inflation, and said head being recessed or chamfered.

4. A pneumatic valve comprising a valve shell having two elongated internal conical seating faces, a screw plug and a seat member entering said shell as a unit and provided with two correspondingly tapered packing rings adapted to seat equally against such conical seating faces, whereby to make a double air-tight joint, the tapered portions of said packing rings being substantially continuous within the limits of movement upon said tapered seats, whereby there is no obstruction to the movement of either of said conical packing rings into wedging contact with the tapered seats.

5. A pneumatic valve comprising a valve shell having internal screw-threads and an elongated internal coned seat at its outer end beyond such screw-threads, and an internal elongated conical seat intermediate its ends just beyond such screw-threads, a seat member inseparably connected with a screw plug externally threaded to engage the screw-threads, within the valve shell the seat member and screw plug having packing rings located respectively to seat only against said internal seats in the shell, said packing rings being capable of unobstructed movement on said internal seats until stopped by the wedging fit or contact of said packing rings on said internal conical seats.

6. A pneumatic valve comprising a valve shell having two elongated internal conical seating faces, a seat member and a screw plug insertable and removable from said shell as a unit and having two correspondingly tapered packing rings adapted to seat against such conical seating faces, whereby to make a double air-tight joint, the upper packing ring being free from parts which would contact with the end of the valve shell, and thereby check the inward movement of the seat member before both packings have become tightly seated against such conical faces.

In witness whereof, I have hereunto signed my name in the presence of two subscribing witnesses.

HENRY P. KRAFT.

Witnesses:
 THOMAS F. WALLACE,
 FRED WHITE.